No. 679,486. Patented July 30, 1901.
W. I. TUTTLE.
METHOD OF TESTING RECEPTACLES.
(Application filed Mar. 29, 1901.)
(No Model.) 2 Sheets—Sheet 1.
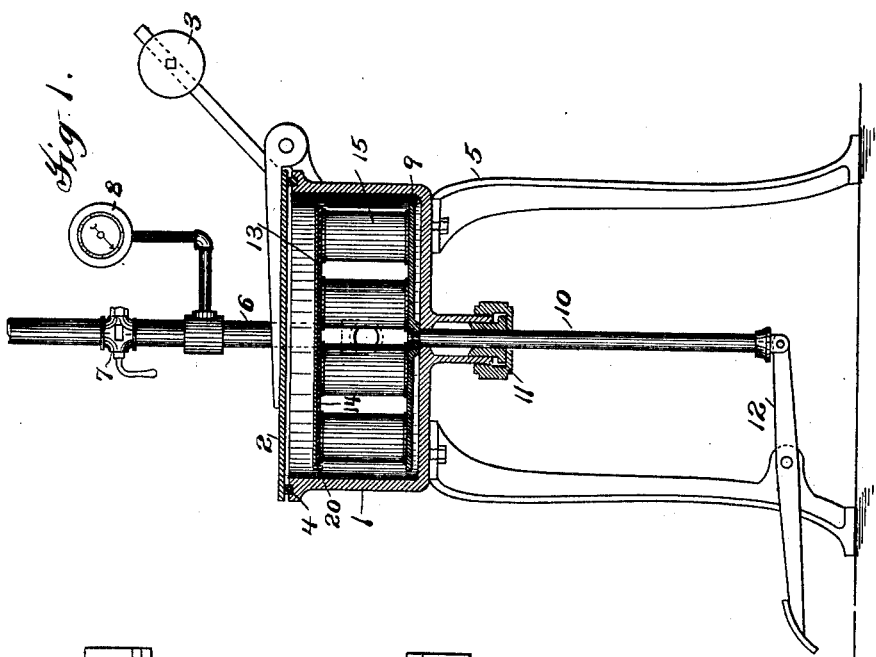
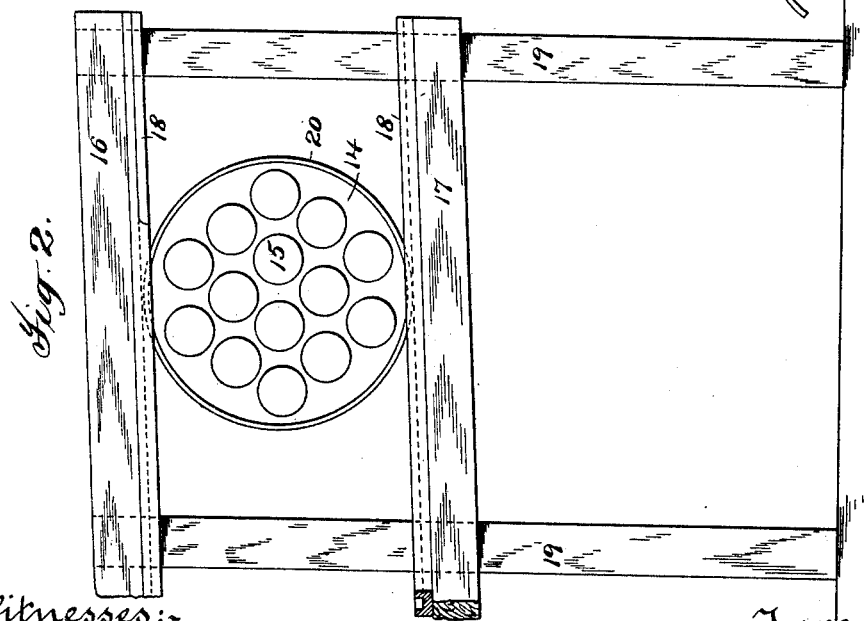
Witnesses:
Geo. H. Botts
T. F. Kehoe
Inventor:
Washington I. Tuttle
by Philipp, Sawyer, Rice & Kennedy
Attorneys
THE NORRIS PETERS CO., PHOTO-LITHO., WASHINGTON, D. C.

No. 679,486. Patented July 30, 1901.
W. I. TUTTLE.
METHOD OF TESTING RECEPTACLES.
(Application filed Mar. 29, 1901.)
(No Model.) 2 Sheets—Sheet 2.
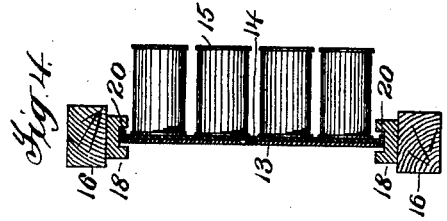
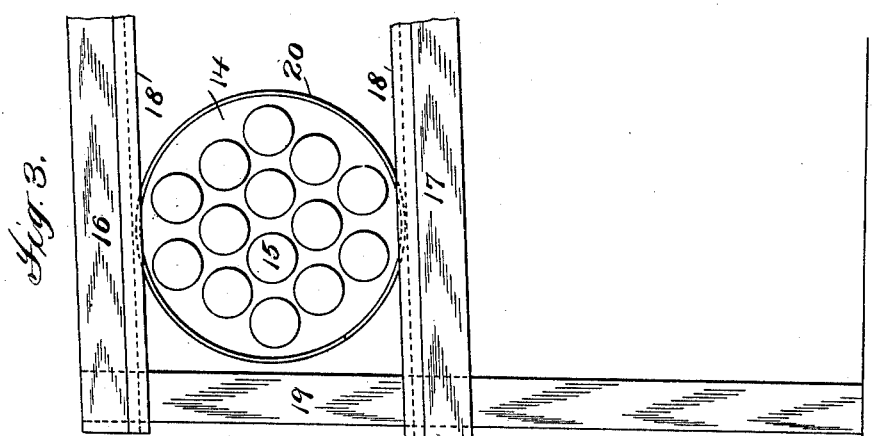
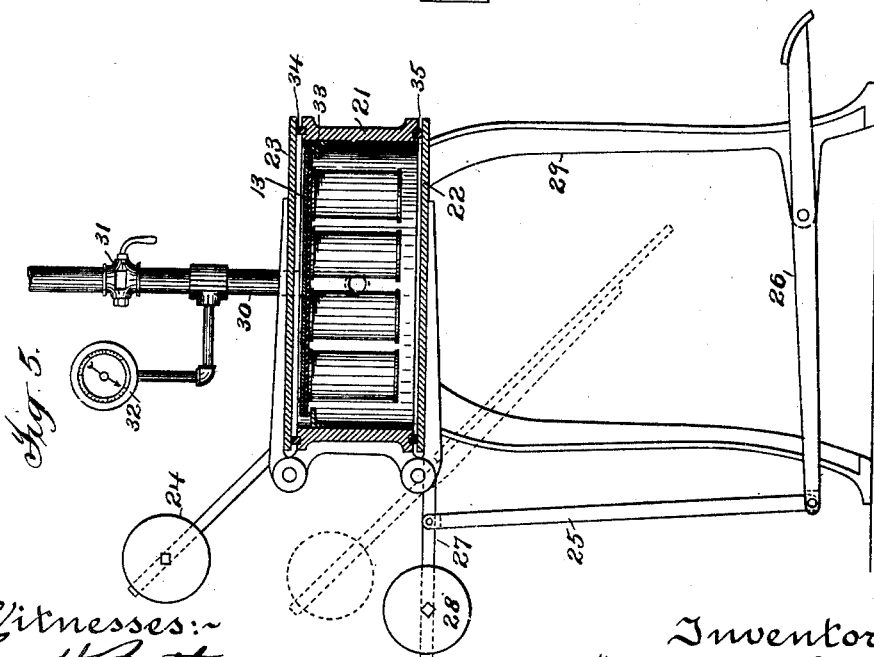

UNITED STATES PATENT OFFICE.

WASHINGTON I. TUTTLE, OF BALTIMORE, MARYLAND, ASSIGNOR TO THE AMERICAN TOBACCO COMPANY, OF NEW YORK, N. Y.

METHOD OF TESTING RECEPTACLES.

SPECIFICATION forming part of Letters Patent No. 679,486, dated July 30, 1901.

Application filed March 29, 1901. Serial No. 53,388. (No specimens.)

*To all whom it may concern:*

Be it known that I, WASHINGTON I. TUTTLE, a citizen of the United States, residing at Baltimore city, in the State of Maryland, have invented certain new and useful Improvements in Methods of Testing Receptacles, fully described and represented in the following specification and the accompanying drawings, forming a part of the same.

This invention relates to a method of testing cans or other similar receptacles.

Cans or other similar receptacles are now ordinarily tested by filling them with air under pressure and plunging them in a tank of water. When the cans are imperfect, the air will escape from them, and the existence of the imperfection will be indicated by bubbles in the water. This method of procedure is slow and is usually unsatisfactory, for the reason that in some cases the leaks in the can are so small that the air will not escape in sufficient quantity and with sufficient rapidity to form a bubble in the space of time during which it is practicable to keep the can or receptacle in the water. It has been further proposed to test cans by constructing a rotating wheel or carrier which is provided with a series of elastic pads, said pads being perforated by nipples, from which lead pipes which may be successively connected to an exhaust apparatus. As the wheel rotates a can is placed over the nipple, and the pipe leading from this nipple is then brought in connection with the exhaust apparatus, so that the air is exhausted from the can. By a proper valve the pipe is closed, so that the vacuum will be maintained in the can if the can is perfect, and the can will be held against the elastic pad by atmospheric pressure. Should, however, the can be imperfect, air will enter through the imperfection and the can will become detached from the pad. If the can remains attached to the pad when the wheel has completed a rotation, the valve is turned so as to permit the air to enter it, and it is thus detached from the pad. This method is also unsatisfactory, since to properly test the cans they must be allowed to remain subject to atmospheric pressure for some little time. The rotation of the wheel therefore must be slow, and the capacity of the apparatus is consequently limited. Furthermore, the apparatus is expensive and complicated to construct. This method of testing has not therefore gone into extensive use.

It is the object of this invention to improve upon the heretofore-existing methods of testing cans or similar receptacles by subjecting the receptacles to operations which may be quickly and readily performed, whereby large numbers of cans may be tested in a short time and without the necessity of complicated and expensive apparatus.

Inasmuch as the invention will be more readily understood from a specific description of the same, such a description will now be given, reference being had to the accompanying drawings, which form a part of this specification and which illustrate a form of apparatus by which the invention may be readily carried out, it being understood, however, that the invention does not depend upon this or any particular form of apparatus.

In said drawings, Figure 1 illustrates a form of exhaust apparatus which may be used in carrying one step of the method into effect. Fig. 2 illustrates one end of a conveyer which may be used to transfer the cans from the apparatus shown in Fig. 1 to another apparatus. Fig. 3 is a view illustrating the other end of the conveyer shown in Fig. 2. Fig. 4 is a sectional view of the conveyer, and Fig. 5 illustrates another form of exhaust apparatus which may be used in carrying another step of the method into effect.

In carrying out the method which forms the subject of this invention the receptacle or receptacles which are to be tested are first closed by a temporary sealing-plate, after which a vacuum is produced in the receptacles. The receptacles are then subjected to gaseous and, preferably, atmospheric pressure, so that the receptacles will be held thereby against the plate. These operations will preferably be accomplished by placing the receptacle or receptacles to be tested in a vacuum-chamber, exhausting the air therefrom, and then permitting the air to suddenly reënter the chamber. The sudden ingress of air into the chamber forces the receptacle or receptacles against the sealing-plate, and the plate and receptacle or receptacles may then be removed from the chamber and allowed to stand, preferably in the open air, for a sufficient length of time to allow air to enter the receptacle or receptacles in case any of them are imperfect.

In Fig. 1 of the drawings there is illustrated a vacuum-chamber 1, which may be employed in carrying the first step of the method into effect. This chamber is provided with a hinged cover 2, to which is secured a counterbalancing-weight 3, which enables the cover to be more easily manipulated. A gasket 4 is or may be provided between the chamber and the cover, and the chamber will preferably be mounted on suitable legs 5. A pipe 6 is tapped into the chamber, said pipe leading to any form of exhaust mechanism—as, for instance, a fan. (Not shown.) A controlling-valve 7 is located in the pipe and a gage 8 attached thereto, which will serve to indicate the degree of vacuum which the exhaust apparatus produces in the chamber. The chamber is preferably provided with a movable plate 9, which is or may be operated by a lifter-rod 10, said rod passing through a suitable stuffing-box 11 and being operated by a treadle 12 or in any other suitable manner. The cans or receptacles to be tested are placed in the chamber and are covered by a sealing-plate 13. This plate may be formed of any suitable material, but is preferably of metal, and is provided with an elastic surface 14, which may be made of soft rubber.

The method is particularly adapted for the simultaneous testing of a number of cans or receptacles, and a plurality of said receptacles are shown in the chamber, said receptacles being marked 15.

In carrying the method into effect the cans and sealing-plate are placed in the chamber, as shown, and the valve 7 is turned so as to allow the exhaust apparatus to create a vacuum in the chamber. When a sufficient vacuum has been obtained, the valve is turned so as to cut off the exhaust apparatus. After the vacuum has been obtained in the cans the plate and cans are subjected to gaseous pressure, so that the cans may become attached to the plate. This operation is preferably effected by constructing the valve 7 so that when turned to cut off the action of the exhaust it will permit the air to rush into the chamber, the sudden inrush of air effecting the attachment of the plate and cans in a well-understood manner.

While the plate and cans might be allowed to remain in the chamber a sufficient time to permit the air to enter any can which is imperfect, and thus be detached from the plate, the operation of testing a large number of cans will be more expeditiously performed by immediately removing the plate and cans from the chamber. Preferably, therefore, as soon as the air has been allowed to reënter the chamber the cover 2 will be swung up and the cans and sealing-plate raised by operating the treadle 12 and raising the movable plate 9.

In order to detect minute leaks or imperfections in the cans, it is desirable to allow the cans and plate to stand under atmospheric pressure for some little time. To effect this, there may be provided a runway, consisting of upper and lower bars 16 and 17, said bars being provided with grooved tracks 18 and supported on standards 19. The sealing-plate 13 will preferably be circular in form and provided with a flange 20, which will engage the grooved tracks. The runway will preferably be slightly inclined, so that the sealing-plate will roll gently down the same. The cans while remaining in the runway are of course subject to the pressure of the atmosphere, and the air will enter any imperfect can and it will become detached from the plate. After the cans have been subjected to the atmospheric pressure for a sufficient length of time to thoroughly test them they are detached from the sealing-plate by equalizing the pressure inside and outside of them. This may be accomplished in any desired manner. Preferably, however, the apparatus illustrated in Fig. 5 will be employed for this purpose. This apparatus consists of a chamber 21, having a hinged bottom 22 and a hinged cover 23. A counterbalance 24 is or may be attached to the cover 23, and the bottom 22 may be conveniently operated by a link 25, attached to a treadle 26, said link being further attached to an arm 27, which carries a counter weight 28. The chamber 21 is or may be conveniently supported on legs 29. A pipe 30, having a controlling-valve 31, is tapped into the side of the chamber, said pipe being connected to any suitable exhaust mechanism and also being preferably provided with a vacuum-gage 32. The inside of the chamber will be preferably provided with a supporting-flange 33, upon which the sealing-plate 13 may be placed. This flange is so arranged that when the plate carrying the cans is resting thereon the ends of the cans will be supported at some distance above the bottom of the chamber. A sealing-plate and its attached cans having been placed in the chamber, the valve 31 is turned so as to allow the exhaust mechanism to create a vacuum therein, suitable gaskets 34 and 35 being preferably employed between the cover and the chamber and the movable bottom of the chamber. The creation of the vacuum in the chamber 21 immediately equalizes the pressure, and the cans will drop from the plate. The valve 31 will then be turned so as to allow the air to reënter the chamber, after which the movable bottom may be operated and the cans allowed to slide out of the chamber.

In practicing the invention it will be understood, of course, that a number of sealing-plates will be employed. The runway may be made long enough so that the cans will be exposed to atmospheric pressure a sufficient length of time during the transit of the plates from one end of the runway to the other, or the runway may be shorter and used as a rack, in which case a single operator after operating the vacuum apparatus shown in Fig. 1 until the runway is filled with plates and cans may then go to the other end of the runway and operate the apparatus shown in Fig. 5 to release the cans from the plates.

While, as has been indicated, the method is particularly adapted to the expeditious testing of a plurality of cans simultaneously, it will be understood that it might be used for testing single receptacles. While, furthermore, the apparatus which has been described is particularly effective, it is to be understood that the method is in no way dependent upon it, as it may be carried into effect in many other ways.

What is claimed is—

1. The method of testing cans or similar receptacles which consists in covering a receptacle or receptacles with a sealing-plate, producing a vacuum in the receptacle or receptacles, subjecting the receptacle or receptacles and plate to gaseous pressure for a period of time, whereby the receptacle or receptacles and plate are first forced together and thereafter the gas enters any imperfect receptacle and said receptacle becomes detached from the plate, and finally subjecting the plate and attached receptacle or receptacles to the action of an exhaust apparatus, whereby the pressure inside and outside the receptacle or receptacles is equalized and the perfect receptacle or receptacles become detached from the plate, substantially as described.

2. The method of testing cans or similar receptacles which consists in covering a receptacle or receptacles with a sealing-plate, subjecting the plate and receptacle or receptacles to the action of an exhaust apparatus in a closed chamber, subjecting the receptacle or receptacles and plate to gaseous pressure in the same chamber, removing the plate and receptacle or receptacles from the chamber and permitting them to stand under gaseous pressure for a period of time, whereby any imperfect receptacle will become detached from the plate, and finally equalizing the pressure inside and outside the receptacle or receptacles whereby the perfect receptacle or receptacles are detached from the plate, substantially as described.

3. The method of testing cans or similar receptacles which consists in covering a receptacle or receptacles with a sealing-plate, subjecting the plate and receptacle or receptacles to the action of an exhaust apparatus in a closed chamber, subjecting the receptacle or receptacles and plate to gaseous pressure in the same chamber, removing the plate and receptacle or receptacles from the chamber and permitting them to stand under gaseous pressure for a period of time, whereby any imperfect receptacle will become detached from the plate, and finally subjecting the plate and attached receptacle or receptacles to the action of an exhaust apparatus in a closed chamber, whereby the perfect receptacles are detached from the plate, substantially as described.

4. The method of testing cans or similar receptacles which consists in covering a receptacle or receptacles with a sealing-plate, subjecting the plate and receptacle or receptacles to the action of an exhaust apparatus in a closed chamber, subjecting the receptacle or receptacles and plate to gaseous pressure in the same chamber, removing the plate and receptacle or receptacles from the chamber, subjecting the receptacle or receptacles to atmospheric pressure in such position that the action of gravity will tend to separate them from the plate, whereby any imperfect receptacle will become detached from the plate, and finally equalizing the pressure inside and outside the receptacle or receptacles whereby the perfect receptacle or receptacles are detached from the plate, substantially as described.

5. The method of testing cans or similar receptacles which consists in covering a receptacle or receptacles with a sealing-plate, subjecting the plate and receptacle or receptacles to the action of an exhaust apparatus in a closed chamber, subjecting the receptacle or receptacles and plate to gaseous pressure in the same chamber, removing the plate and receptacle or receptacles from the chamber, subjecting the receptacle or receptacles to atmospheric pressure in such position that the action of gravity will tend to separate them from the plate, whereby any imperfect receptacle will become detached from the plate, and finally subjecting the plate and attached receptacle or receptacles to the action of an exhaust apparatus in a closed vacuum-chamber, whereby the sound receptacles are detached from the plate, substantially as described.

In testimony whereof I have hereunto set my hand in the presence of two subscribing witnesses.

WASHINGTON I. TUTTLE.

Witnesses:
DANIEL AMMER,
FRANK A. CRIST.